(12) United States Patent
Ruoff et al.

(10) Patent No.: US 7,044,160 B1
(45) Date of Patent: May 16, 2006

(54) DEVICE FOR SUPPLYING THE CONSUMERS OF A FUEL CELL SYSTEM WITH LIQUID MEDIA

(75) Inventors: Manfred Ruoff, Moeglingen (DE); Michael Nau, Dornhan/Aischfeld (DE); Marc Bareis, Markgroeningen (DE); Horst Harndorf, Schwieberdingen (DE); Frank Ilgner, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 10/089,404

(22) PCT Filed: Sep. 26, 2000

(86) PCT No.: PCT/DE00/03340

§ 371 (c)(1),
(2), (4) Date: Jun. 21, 2002

(87) PCT Pub. No.: WO01/24294

PCT Pub. Date: Apr. 5, 2001

(30) Foreign Application Priority Data

Sep. 30, 1999 (DE) ................................ 199 47 254

(51) Int. Cl.
*H01M 8/04* (2006.01)
(52) U.S. Cl. ..................................... 137/565.3; 429/25
(58) Field of Classification Search ............. 137/487.5, 137/565.3, 565.33; 429/22, 25
See application file for complete search history.

(56) References Cited

U.S. PATENT DOCUMENTS

| 3,873,004 | A | * | 3/1975 | Feild ......................... 137/565.3 |
| 4,796,651 | A | * | 1/1989 | Ginn et al. ............... 137/487.5 |
| 5,111,844 | A | * | 5/1992 | Emmert et al. ........ 137/565.33 |
| 5,488,969 | A | * | 2/1996 | King et al. ............... 137/487.5 |
| 5,686,196 | A | * | 11/1997 | Singh et al. .................... 429/17 |
| 5,700,595 | A | * | 12/1997 | Reiser .......................... 429/25 |
| 5,766,786 | A | | 6/1998 | Fleck et al. |
| 5,981,096 | A | | 11/1999 | Hornburg et al. |
| 6,127,057 | A | * | 10/2000 | Gorman ....................... 429/25 |

FOREIGN PATENT DOCUMENTS

| DE | 31 33 971 | 3/1983 |
| EP | 0 048 960 | 4/1982 |
| JP | 59 005571 | 1/1984 |
| JP | 63 040901 | 2/1988 |
| JP | 09 022713 | 1/1997 |

OTHER PUBLICATIONS

"Strömungsmaschinen Grundlagen und Anwendungen", by H. Sigloch, Carl Hanser Verlag München Wien, Germany, 1984, pp. v, vi, 248 to 252.
"Kraftfahrtechnisches Taschenbuch/Bosch", 22nd edition, Springer-Verlag, 1998, pp. 456 and 457.

* cited by examiner

*Primary Examiner*—John Rivell
(74) *Attorney, Agent, or Firm*—Walter Ottesen

(57) ABSTRACT

An arrangement for supplying liquid media to consumers of a fuel cell system having a feed pump is suggested which is less complex compared to known arrangements. This is achieved in that controllable metering valves (22) are provided between the feed pump (21) and the respective consumers.

12 Claims, 2 Drawing Sheets

DEVICE FOR SUPPLYING THE CONSUMERS OF A FUEL CELL SYSTEM WITH LIQUID MEDIA

FIELD OF THE INVENTION

This application is the national stage of International Application No. PCT/DE00/03340, filed Sep. 26, 2000, designating the United States.

The invention relates to an arrangement for supplying liquid media to consumers of a fuel cell system.

BACKGROUND OF THE INVENTION

Fuel cell technology acquires ever more significance especially in connection with future drive concepts of vehicles. Fuel cells offer the possibility to convert chemically bonded energy directly into electrical energy which thereafter can be converted into mechanical drive energy with the aid of an electric motor. In contrast to thermal power engines, the efficiency of a fuel cell is not limited by a Carnot efficiency. Present day preferred fuel cells consume hydrogen and oxygen and convert these elements into the environmentally friendly end product "water".

Because of the technical problems associated with hydrogen storage in vehicles, hydrogen as required is generated via a so-called reforming or partial oxidation of hydrocarbons. Hydrocarbons of this kind are present in the form of conventional fuels such as gasoline and diesel fuel; however, other hydrocarbons such as methane or methanol can also be used for this purpose. Special requirements are imposed on the corresponding arrangement for chemical conversion in connection with a fuel cell drive (that is, the reformation of fuel into water) compared to previous chemical systems.

One such arrangement must satisfy a considerable load range, that is, large differences in the necessary volume flow of hydrogen and, correspondingly, also the media necessary for generating the hydrogen. A corresponding dynamic performance for generating the desired fluctuations in the volume flow of the media within a short time must be ensured. In addition, an arrangement of this kind must offer an excellent cold start performance and a very substantial operational reliability. Further requirements with respect to the efficiency require a low weight in combination with a small volume and especially low manufacturing costs.

In fuel cell arrangements of the kind described, on the one hand, various media have to be supplied, that is, for example, water, fuel as well as air. On the other hand, one and the same medium, for example, fuel, must be supplied to different system components. Depending upon the configuration of the fuel cell arrangement, for example, a burner for generating the reaction heat for converting the fuel as well as the so-called reformer wherein the fuel is converted or a possible upstream vaporizer can all be supplied with the same fuel.

Likewise, as a rule, different components are to be supplied with water, for example, again the reformer for converting the fuel (for which a vaporizer can be connected upstream thereof, as required) as well as, for example, a unit, which is connected downstream of the reformer, for carrying out a so-called shift reaction in which residual quantities of CO, which result from the reaction in the reformer, are oxidized to $CO_2$ under the addition of water whereby hydrogen is, in turn, released.

Up to now, a so-called metering pump is used for each fluid flow to be prepared in such fuel cell systems. The fluid flow of the particular medium needed in each case is supplied by the metering pump. Such metering pumps are very complex and correspondingly costly.

SUMMARY OF THE INVENTION

Compared to the above, the invention has the task of suggesting an arrangement for supplying media for a fuel cell system which satisfies the above-explained requirements and makes possible a cost-effective manufacture.

In correspondence to the above, the arrangement of the invention is characterized in that a controllable metering valve is provided between the feed pump and the particular consumer of the fuel cell system. With this configuration, the metering takes place via the valve; whereas, the feed pump need only maintain the pumping pressure of the particular medium but is no longer used for metering. Correspondingly, the feed pump can be considerably less complex and therefore can be configured at less cost.

In an advantageous embodiment of the invention, several consumers, which are supplied with the same medium, are each provided with at least one controllable metering valve but fed with the medium via the same feed pump. By interposing the metering valves, the number of feed pumps can thereby be reduced because the same pump can be used for several consumers, that is, for several fluid flows of the same medium. The metering takes place via corresponding cost-effective metering valves.

Metering valves of this kind could, for example, be configured as controllable throttles in the medium line. With these throttles, the volume flow can be adjusted in the respective lines.

In a special embodiment of the invention, a clocked control valve is, however, used as a metering valve. A clocked control valve of this kind is obtainable at less cost than a volume controller. The control of the volume flow takes place with the use of a clocked valve via the adjustment of the clock frequency or the ratio between the switch-on time and the switch-off time within a cycle of the control valve.

However, compared to a volume controller, the volume flow is no longer continuous but is instead subjected to the cycle of the metering valve. In order to nonetheless ensure a quasi continuous medium supply, the use of metering valves is recommended which ought to be operated at a comparatively high clock frequency. The clock frequency is preferably selected to be greater than 10 Hz. The higher the clock frequency is selected, the more continuous is the volume flow formed which is present downstream of the metering valve. The technical realizability of the metering valve therefore imposes upper limits on the clock frequency.

The control of the volume flow is advantageously undertaken via a characteristic field. A control of this kind can be realized with little complexity in that the volume flow amounts, which result with the different actuating variables, are measured and are stored in the form of a characteristic field in a control unit in the memory. The volume flow, which is wanted in accordance with requirements, can then be reproduced for the actuating variables via the corresponding values stored in the characteristic field.

A control of the volume flow is provided in a technically advantageous but more complex further embodiment of the invention. In this way, fluctuating or non-reproducible disturbance quantities can be taken into account depending upon the configuration of the supply arrangement or the total system.

As a control variable, the volume flow behind the metering valve is used which is measured at this location in a specific embodiment of the line.

A less complex measuring device can be realized in the form of a pressure sensor. The metering valve has virtually no hydraulic inductivity and capacity. For this reason, the volume flow can be computed from the instantaneously measured pressure, the known switch-on time, the clock frequency and the prepressure.

The conversion of the medium pressure into the desired volume flow can, for example, take place by computation with the knowledge of a corresponding mathematical function. In an especially simple embodiment, a characteristic field, which is stored in the control unit, can, however, also be used by means of which the value of the corresponding volume flow is assigned directly to a specifically measured pressure.

In a special further embodiment of the invention, the pump is configured to be controllable. The rpm of the pump can thereby be adapted to the desired pumping pressure as well as the desired pumping capacity. Especially for low pumping quantities, corresponding energy savings can be had by the reduction of the pump power.

Furthermore, a pressure controller is advantageously provided in a bypass line from the pump to a supply tank. With the aid of such a pressure controller, the pumping pressure of the pump can be held constant independently of rpm. Depending upon the required volume flow, a correspondingly occurring component flow can then flow via the pressure controller back into the supply tank.

In this connection, the further advantage is provided by the controllable pump that the loss in power, which occurs because of the circulation in the bypass line, can be reduced whereby, on the one hand, energy is saved and an excessive warming of the medium is avoided. Especially in the case of highly volatile fuel, a significant warming in the supply tank would be a source of danger because of the vapors arising therefrom and should absolutely be avoided. Because of an excessive warming of fuel, there furthermore results the danger of unwanted fuel vapor emissions from the fuel tank which should be avoided especially in a fuel cell system.

Preferably, the pressure controller in the bypass line is likewise configured to be controllable so that, depending upon requirements, the prepressure of the media ahead of the metering valves can also be adjusted and can be used as an actuating variable for the metering.

BRIEF DESCRIPTION OF THE DRAWING

The invention will now be described with reference to the drawings wherein.

DESCRIPTION OF THE PREFERRED
EMBODIMENTS OF THE INVENTION

Figure 1:
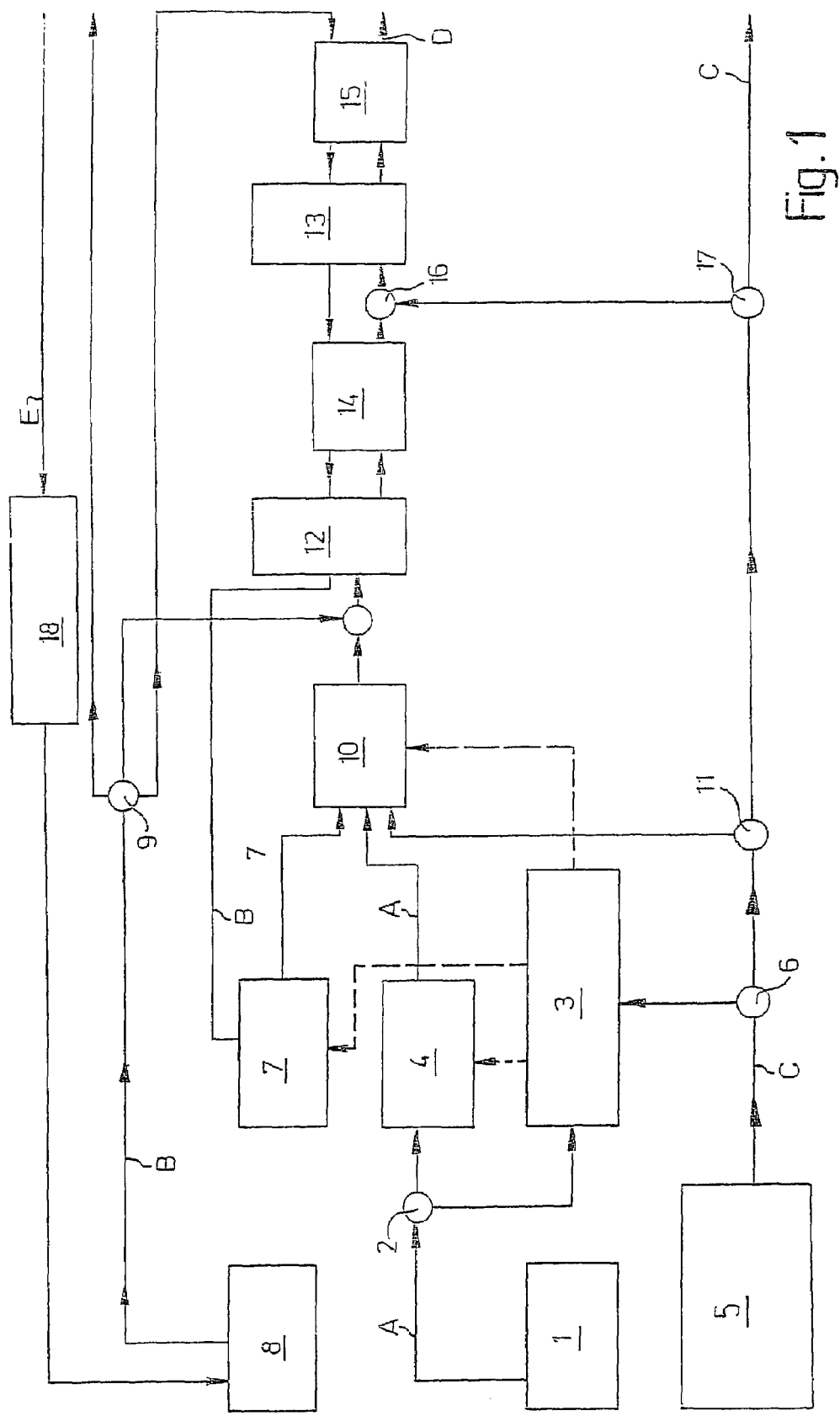
FIG. 1 is a method flow diagram and shows, by way of example, the various fluid flows in a fuel cell system.

In FIG. 1, the solid lines are used for the fluid flows and the broken lines are used for the introduction of energy.

A fuel tank 1 supplies a burner 3 and an evaporator 4 via a corresponding branching connection 2. Via a further branching connection 6, a compressor 5 takes care of the supply of air into the burner 3. The burner 3 yields the generated heat to an evaporator 4 as well as to a further evaporator 7.

The fuel flow is identified by A and the air flow by C.

A water loop is fed from a water tank 8. The water flow is identified by B. The water flow B is subdivided into three branches via a branching connection 9 and, via these three branches, arrives at evaporator 7 as will be explained in greater detail hereinafter.

A reformer 10 is supplied from the evaporator 4 with fuel and with water vapor from the evaporator 7 and with air from the air guide C via a further branching connection 11. In addition, the reformer 10 receives energy from the burner 3.

The described arrangement need not perforce be configured in the manner described. Other process variations are also conceivable wherein only fuel and water as well as fuel and air are fed into the reformer. There are also other process variations possible without fuel vaporization such as via atomization of the fuel. Also, the burner 3 is not required in each embodiment of the reformation of fuel.

In the reformer 10, the fuel, which consists of hydrocarbons, is decomposed by partial oxidation into hydrogen and $CO_2$. Here, residual quantities of CO develop which cannot be tolerated with the fuel cells preferably used at the present time. For this reason, in the configuration shown, two additional reaction stages 12, 13 are connected downstream wherein CO is oxidized to $CO_2$ while splitting water. Here, hydrogen is additionally released.

A heat exchanger 14 is mounted upstream of reaction stage 12 and a heat exchanger 15 is mounted upstream of reaction stage 13 in order to cool the hydrogen flow D, which is finally led to the fuel cell.

Air is supplied for the last reaction stage 13 via a joining connection 16 and a branching connection 17. The air flow C is also supplied to the fuel cell in a manner not described in greater detail.

In the counterflow to the hydrogen-containing fluid flow D, water is supplied to the evaporator 7 from the branching connection 9 via the heat exchangers 14, 15 and via the reaction stages 12, 13. The water is vaporized in the evaporator 7 for transmission to the reformer 10.

A further water flow branch leads to the fuel cell in a manner also not described in greater detail and serves there for membrane moistening. A water vapor return flow E from the fuel cell is conducted via a condenser 18 and the water resulting therefrom is collected in the water tank 8.

From the diagram of FIG. 1, it can be seen how a medium from each reservoir has to be branched into several fluid flows and metered to the respective consumers, for example, the burner 3, the reformer 10 or the reaction stages (12, 13).

Figure 2:
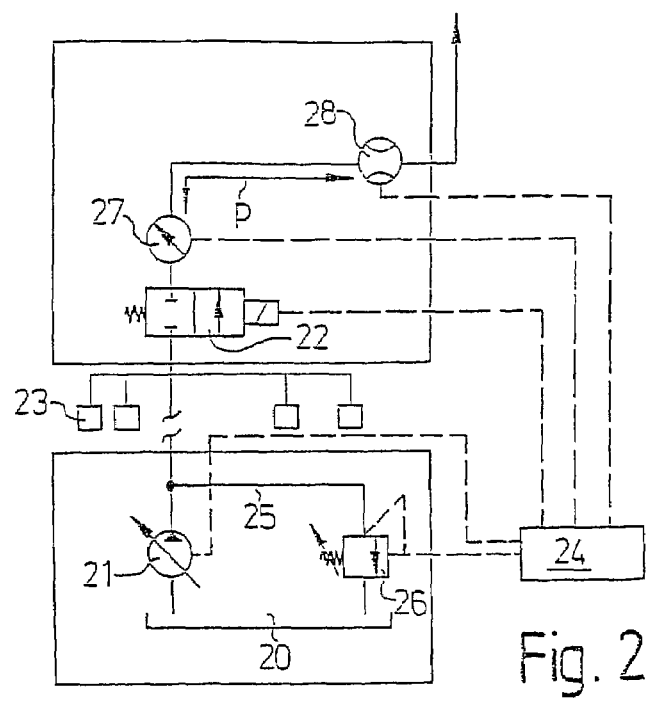
FIG. 2 is a schematic diagram of a first embodiment of the invention.

This is realized, for example, by an embodiment according to FIG. 2. For each type of medium which is to be metered (that is, for example, for the fuel as well as for the water), one such arrangement can be provided.

In FIG. 2, control lines are shown by broken lines and media lines are shown by solid lines. The corresponding medium is held in a supply tank 20. Referring to FIG. 1, the supply tank can, for example, be the fuel tank 1 or the water tank 8. A pump 21 supplies a prepressure which is present ahead of a metering valve 22. Branches to additional metering valves 23 are indicated ahead of the metering valve 22. From this it can be seen that different consumers can be supplied by the pump 21 by interposing the metering valves (22, 23).

The metering valve 22 is clocked via a control unit 24. To ensure a constant pressure ahead of the metering valves (22, 23), a bypass 25 is provided with a pressure controller 26. The pump 21 can be operated at a constant rpm whereby a backflow into the supply tank 20 takes place via the bypass 25 and the pressure controller 26. The backflow is dependent upon the quantity flowing out via the metering valve 22 and a continuous prepressure is always present ahead of the valve 22.

In a simple embodiment of the invention, the metering is undertaken by clocking the control valve 22 or 23 via the control unit 24 without a control of the fluid flow resulting actually rearward of the metering valves (22, 23). This is possible in arrangements wherein a reproducible fluid flow is achievable downstream of the metering valves (22, 23) with pregiven clock parameters, that is, clock frequency and switch-on duration.

Especially when this fluid flow is not dependent proportionally from the corresponding control parameters, a corresponding characteristic field can be used for the control in a special embodiment and this characteristic field allocates the corresponding fluid flow to the particularly adjusted control parameters.

In a further embodiment of the invention, a control of the fluid flow rearward of the metering valve 22 is provided. For this purpose, two measuring value sensors are present, that is, a pressure measuring unit 27 as well as a volume flow measuring unit 28. The two measuring value sensors (27, 28) are provided alternatively to each other which is indicated by the double arrow p. In this way, embodiments are possible which either have only the pressure measuring unit 27 or only the volume flow measuring unit 28.

If a volume flow measuring unit 28 is provided, the required control variable is measured directly and therefore is available to the control unit 24 for controlling the volume flow. The comparatively complex time intensive measurement of the volume flow can be replaced by a simpler rapid pressure measurement as explained above.

In the case of a more cost-effective pressure measuring unit 27, a relationship between the measured pressure behind the metering valve 22 and the volume flow is to be first established. This relationship can either be established in the form of a mathematical function if all influence parameters and their influences are known or it can be produced in the form of a characteristic field wherein measured volume flow values are assigned to one-time measured pressure values and these measured volume flow values are stored so that, during the later operation, the volume flows, which are to be assigned to the respective pressure values, can be called up from the memory.

A controlled version of the invention is especially then of advantage when disturbance quantities influence the volume flow which are not reproducible and cannot be determined by computation.

Counterpressure pulses from thin-layer evaporators, et cetera, are to be considered as disturbance quantities. Such counterpressure pulses are subjected to a certain periodic characteristic. For this reason, it is recommended to keep the clock frequency above this disturbance frequency.

Another possibility to counter disturbance quantities in the form of counterpressure pulses comprises increasing the prepressure via the pump 21.

A further advantageous measure results when the pump 21 and/or the pressure controller 26 are configured to be controllable. The prepressure ahead of the metering valves (22, 23) can be controlled via the control of the pressure controller 26 and can thereby be applied additionally as a control quantity. With the control of the pump rpm of the pump 21, the pump power can be adapted to the respective required fluid flow and thereby unnecessary flow recirculations via the bypass 25 can be avoided. This leads, on the one hand, to a saving of energy and reduces, on the other hand, the warming of the medium in the supply tank 20 which is absolutely necessary when recirculating via the bypass 25.

Figure 3:
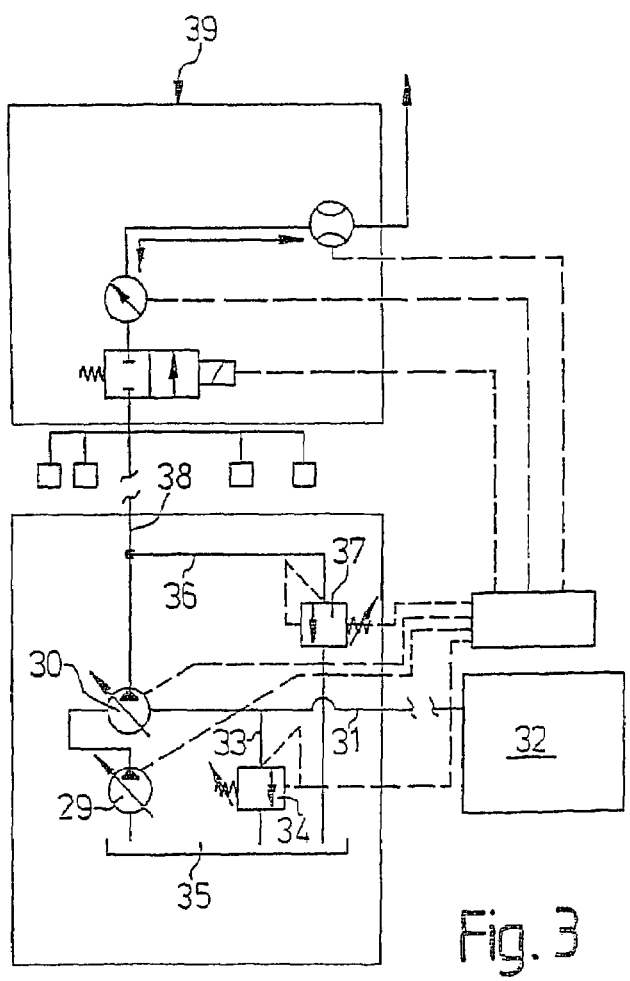
FIG. 3 shows a second embodiment of the invention.

The configuration of FIG. 3 distinguishes from the above-mentioned embodiment in that a double pump arrangement and a double bypass arrangement are provided. A low pressure pump 29 feeds a high pressure pump 30 and thereby ensures that the media supply of the high pressure pump 30 is free of possible air pockets.

A low pressure line 31 leads to a metering unit 32 which can correspond to the above-described arrangement having metering valve 22. A media recirculation into the supply tank 35 is established via a bypass 33 and a pressure controller 34 so that the prepressure on the low pressure line 31 is, in turn, defined.

A like arrangement is provided on the high pressure end with a bypass 36 and a further pressure controller 37. Here too, a recirculation into the supply tank 35 takes place.

The high pressure line 38 leads to a metering unit 39 which, in turn, can correspond to the above-described embodiment.

The low pressure pump 29 as well as the high pressure pump 30 are shown here as controllable pumps which, however, need not perforce be the case and instead defines a further measure of the invention. Likewise, the pressure controllers 34 and 37 are both configured as controllable pressure controllers which makes possible controlling the prepressure in the low pressure region as well as in the high pressure region. This too is an advantageous embodiment of the invention.

The use of a high pressure loop as described with respect to the embodiment of FIG. 3 can, for example, be advantageous when the pumped medium is atomized at high pressure or is otherwise prepared for the reactions to follow. A high pressure loop can also be advantageous for pressure-dependent disturbance quantities which are to be suppressed by a high prepressure.

As can be seen in the description provided herein, many advantageous further embodiments of the invention are possible. However, what remains essential is that the pump 21 need no longer be configured as a metering pump because of the use of a metering pump 21 in combination with a metering valve 22. At the same time, the possibility is present in this arrangement to feed several consumers of the same medium via the same pump.

REFERENCE NUMERAL LIST

1 Fuel tank
2 Branching connection
3 Burner
4 Evaporator
5 Compressor
6 Branching connection
7 Evaporator
8 Water tank
9 Branching connection
10 Reformer
11 Branching connection
12 Reaction stage
13 Reaction stage
14 Heat exchanger
15 Heat exchanger
16 Connection
17 Branching connection 18 Condenser
20 Supply tank
21 Pump
22 Metering valve
23 Metering valve
24 Control unit
25 Bypass
26 Pressure controller
27 Pressure measuring unit
28 Volume flow measuring unit
29 Low pressure pump
30 High pressure pump
31 Low pressure line
32 Metering unit
33 Bypass
34 Pressure controller
35 Supply tank
36 Bypass
37 Pressure controller
38 High pressure line
39 Metering unit

The invention claimed is:

1. A fuel cell system comprising:
consumers comprising at least one fuel cell;
an arrangement for supplying fluid medium to said consumers; and,
the arrangement including: a feed pump unit; a controllable metering valve interposed between said feed pump and said consumers; and, said feed pump unit including a high-pressure feed pump and a low-pressure feed pump for feeding said high-pressure feed pump thereby ensuring that said media is free of possible air pockets.

2. The fuel system of claim 1, wherein a portion of said consumers consume the same medium; and, wherein said arrangement further comprises a plurality of said controllable metering valves connected downstream of said feed pump and operatively connected to respective ones of the consumers of said portion of said consumers.

3. The fuel system of claim 1, wherein said controllable metering valve is a clocked control valve.

4. The fuel system of claim 1, wherein at least one of the switch-on duration and the clock frequency of said controllable metering valve is controllable.

5. The fuel system of claim 4, wherein the clock frequency is greater than 10 Hz.

6. The fuel system of claim 1, wherein the control of said controllable metering valve is provided by a stored characteristic field.

7. The fuel system of claim 1, further comprising means for controlling the volume flow of said media.

8. The fuel system of claim 1, further comprising at least one of a measurement value sensor for detecting the volume flow and a measurement value sensor for measuring pressure mounted in flow direction behind said controllable metering valve.

9. The fuel system of claim 1, further comprising:
means for measuring the pressure in flow direction downstream of said controllable metering valve; and,
a characteristic field assignment of said pressure to the volume flow present at said pressure.

10. The fuel system of claim 1, wherein said feed pump unit is controllable with respect to its rpm.

11. The fuel system of claim 1, further comprising:
a supply tank holding at least one of said media;
a bypass line connected between said supply tank and said feed pump unit; and,
a pressure controller connected in said bypass line.

12. The fuel system of claim 11, wherein said pressure controller is controllable.

* * * * *